United States Patent
Xu et al.

(10) Patent No.: US 8,014,173 B2
(45) Date of Patent: Sep. 6, 2011

(54) RESONANT CONVERTER FOR SYNCHRONOUS RECTIFICATION CONTROL

(75) Inventors: Ming Xu, Blacksburg, VA (US); Bo Yuan, Xi'an (CN); Qiao Liong Chen, Xi'an (CN)

(73) Assignee: FSP Technology Inc., Taoyuan, Taoyuan Hsien (TW)

( * ) Notice: Subject to any disclaimer, the term of this patent is extended or adjusted under 35 U.S.C. 154(b) by 497 days.

(21) Appl. No.: 12/252,828

(22) Filed: Oct. 16, 2008

(65) Prior Publication Data
US 2010/0097826 A1  Apr. 22, 2010

(51) Int. Cl.
  *H02M 3/335* (2006.01)
(52) U.S. Cl. .............. 363/17; 363/70; 363/89
(58) Field of Classification Search ........... 363/17, 363/21.02, 21.06, 21.14, 69, 70, 89
See application file for complete search history.

(56) References Cited

U.S. PATENT DOCUMENTS

| | | | |
|---|---|---|---|
| 6,667,893 B2 * | 12/2003 | Daun-Lindberg et al. | 363/65 |
| 7,079,403 B2 * | 7/2006 | Liu et al. | 363/16 |
| 7,701,736 B2 * | 4/2010 | Yang et al. | 363/89 |
| 2007/0086224 A1 * | 4/2007 | Phadke et al. | 363/65 |
| 2009/0109715 A1 * | 4/2009 | Yang et al. | 363/89 |
| 2009/0135631 A1 * | 5/2009 | Yang | 363/89 |
| 2010/0026095 A1 * | 2/2010 | Phadke | 307/31 |
| 2010/0097826 A1 * | 4/2010 | Xu et al. | 363/17 |

* cited by examiner

*Primary Examiner* — Jeffrey L Sterrett
(74) *Attorney, Agent, or Firm* — Muncy, Geissler, Olds & Lowe, PLLC

(57) ABSTRACT

A resonant converter for improving synchronous rectification control is provided. The resonant converter obtains an input power, and through a switch unit, the period of the input power to be transmitted to a resonant circuit can be modified. The resonant converter further includes two transformers electrically connected to the resonant circuit, two synchronous controllers electrically connected to the primary sides of two transformers respectively, and two synchronous rectifiers electrically connected to the secondary sides of two transformers. The input power modified by the resonant circuit is obtained by the primary sides of two transformers, and two induced power are respectively produced at the secondary sides. Then, through sensing the polarity variation of the voltage, the two synchronous controllers individually provide a synchronous driving signal. Furthermore, the synchronous driving signals respectively drive two synchronous rectifiers to conduct alternatively, so as to rectify the induced power to the output terminal.

5 Claims, 2 Drawing Sheets

RESONANT CONVERTER FOR SYNCHRONOUS RECTIFICATION CONTROL

FIELD OF THE INVENTION

The present invention is related to a resonant converter for improving synchronous rectification control, and more particularly to a resonant converter utilizing LLC resonant circuit.

BACKGROUND OF THE INVENTION

LLC resonant circuit is characteristic of high efficiency and larger ranges of input voltage and load, so that it becomes a better architecture for conversion circuit. However, if LLC resonant circuit is cooperated with the conventional diode rectification circuit for providing output, the rectification diode will almost cause half of the whole loss. Therefore, synchronous rectification technology is used for improving the efficiency, as shown in FIG. 1, which shows the LLC resonant converter employing synchronous rectification technology. In FIG. 1, the converter is connected with a power source 1 for obtaining an input power. The power source 1 is connected to a switch unit 2, which is controlled by a pulse width modification unit 21, so that the current period of the switch unit 2 can be adjusted. The other terminal of the switch unit 2 is connected to a resonant circuit 3, which is an LLC circuit architecture composed of a resonant capacitor 31, a first resonant inductor 32 and a second resonant inductor 33. After passing through the switch unit 2, the conducting period and the flow direction of the input power are adjusted, and then, through a gain modification provided by the resonant circuit 3, the input power is transmitted to a transformer 4 for providing energy to the secondary side of the transformer 4. The secondary side of the transformer 4 has two synchronous rectifiers (SR) 61, 62 and also two synchronous controllers 51, 52 for respectively detecting the polar variation of power so as to produce a driving pulse to drive the synchronous rectifiers 61, 62, thereby synchronizing the synchronous rectifiers 61, 62 and the secondary side current of the transformer 4. Although in the market there already has IC can control the rectifiers 61, 62 (such as the product IR 1167 produced by INTERNATIONAL RECTIFIER), the above described IR 1167 is still limited by the maximum working frequency of 500 kHz, the high cost and the requirement for synchronous rectifier parasitic inductor, which restrict the application thereof.

Currently, a current driven synchronous rectifier (CDSR) is developed for satisfying the operation requirement of LLC converter under high frequency. However, as increasing the output current, there will be two problems arisen at high frequency and high output current. One is the synchronous controllers 51, 52 for the two rectification loops (as Loop 1 and Loop 2 surrounded by dashed lines), as shown in FIG. 1, might become too sensitive to cause error, and the loop inductance formed by AC impedance and rectifier loop will have a significant rise so as to reduce efficiency. The other is both the efficiency and the energy density of CDSR will become low, so as to influence the performance of LLC converter negatively.

SUMMARY OF THE INVENTION

For overcoming the limitations presented as the LLC converter has a high current output, the present invention provides an improved circuit architecture of LLC converter for solving the problems produced as the LLC converter is under high frequency and high current output.

The present invention is related to a resonant converter for improving synchronous rectification control. The resonant converter is connected to a power source for obtaining an input power, and through conduction and cutoff of a switch unit, the period of the input power to be transmitted to a resonant circuit can be modified. The resonant converter further includes two transformers electrically connected to the resonant circuit, two synchronous controllers electrically connected to the primary sides of two transformers respectively, and two synchronous rectifiers electrically connected to the secondary sides of two transformers respectively. The input power modified by the resonant circuit is obtained by the primary sides of two transformers, and two induced power with opposite phases are respectively produced at the secondary sides. Then, through sensing the polarity variation of the voltage from the transformers, the two synchronous controllers individually provide a synchronous driving signal. Furthermore, the synchronous driving signals respectively drive two synchronous rectifiers to conduct alternatively, so as to rectify the induced power with opposite phases to the output terminal.

Through the circuit architecture described above, the advantages are:

1. The synchronous controllers can detect the power variation at the primary side of the transformers for avoiding the synchronous controllers from being too sensitive to cause error.

2. The conventional design of single transformer with tap at the center of windings can be replaced by two transformers, so that the labor caused from the complicated procedure can be saved.

3. Since the synchronous controllers are positioned at the primary sides, the AC impedance and loop inductance at the secondary sides can have significant drop so as to improve the efficiency of the converter.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DESCRIPTION OF THE PREFERRED EMBODIMENT

Figure 1:
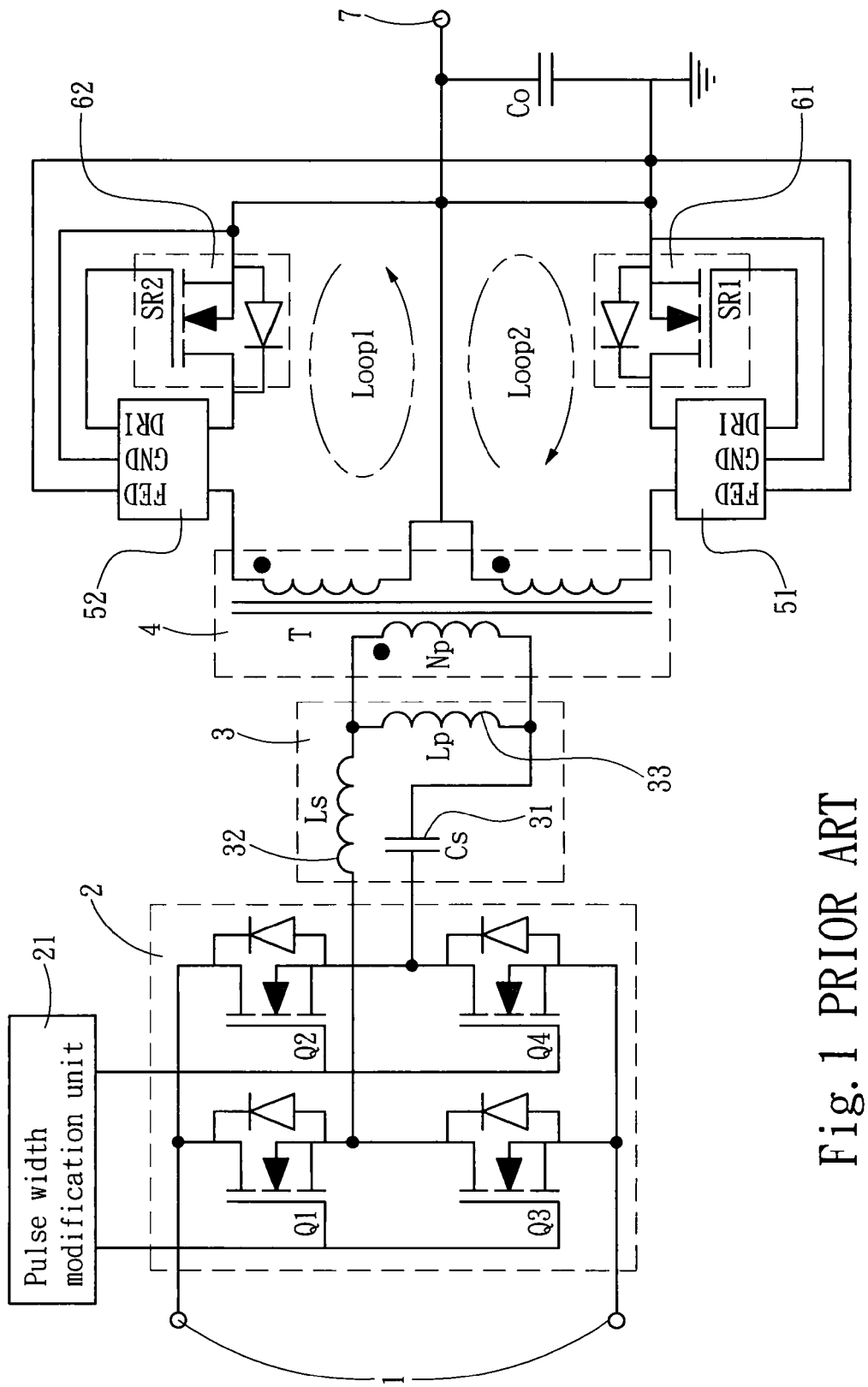
FIG. 1 shows the circuit architecture of a conventional resonant converter.
Figure 2:
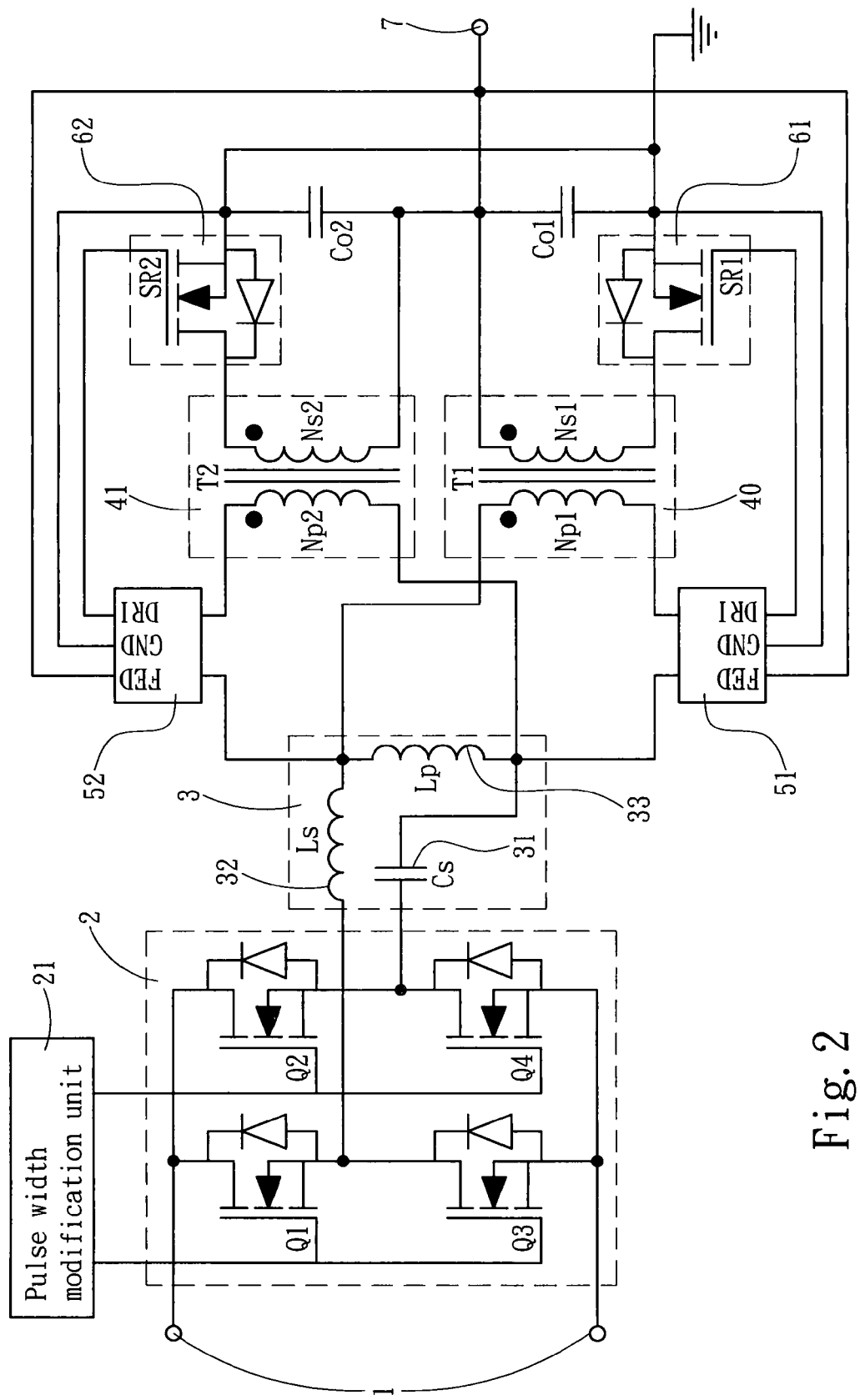
FIG. 2 shows the circuit architecture of a resonant converter according to the present invention.

The present invention is related to a resonant converter for improving synchronous rectification control, and the circuit architecture thereof is shown in FIG. 2. The resonant converter is connected with a power source 1 for obtaining an input power, and the input power is a direct current. A pulse width modification unit 21 produces a driving pulse to control the conduction and cutoff of a switch unit 2, so as to modify the period and flow direction of the input power to a resonant circuit 3. The resonant circuit 3 is sequentially composed of a resonant capacitor 31, a first resonant inductor 32, and a second resonant inductor 33 which are connected in series. Moreover, the resonant converter also has two transformers 40, 41 electrically connected to the resonant circuit 3, and the primary sides of the two transformers 40, 41 are used to obtain the input power that is modified by the resonant circuit 3, wherein in the primary side windings of the two transformers 40, 41, the sides which have identical polarity are connected to the identical terminal of the resonant circuit 3. For the resonant circuit 3, the second resonant inductor 33 is connected between the transformers 40, 41 in parallel. In the secondary side windings of the transformers 40, 41, the sides which have opposite polarities are electrically connected with each other, and one of the sides is electrically connected to an output terminal 7. Therefore, through the connection relationship between two transformers 40, 41, when the switch unit 2 alternatively conducts and modifies the input power for continuously change the flowing direction of the input power, the input power also alternatively passes through the two transformers 40, 41 in turn. As shown in FIG. 2, when the switching elements Q1 and Q4 of the switch unit 2 are conducted and the switching elements Q2 and Q3 are off, the current of the input power is gain modified by the resonant circuit 3 and then passes through the primary side of the transformer 40 (T1). At this same, the primary side of the transformer 41 (T2) has no current passed therethrough. Identically, when the switching elements Q2 and Q3 of the switch unit 2 are conducted, the current of the input power is gain modified by the resonant circuit 3 and then passes through the primary side of the transformer 41 (T2). Furthermore, the primary sides of two different transformers 40, 41 are electrically connected to two synchronous controllers 51, 52, respectively, and through the connections to the transformers 40, 41, the two synchronous controllers 51, 52 can sense the polar variation of the voltage passing through the primary sides of the transformers 40, 41. And, as shown in FIG. 2, the synchronous controller 52 is connected to one side of the transformer 41 with positive polarity, and other synchronous controller 51 is connected to one side of another transformer 40 with negative polarity, so that each controller can produce a synchronous driving signal. Then, the synchronous driving signals are respectively transmitted to the synchronous rectifiers 61, 62 at the secondary sides of two transformers 40, 41. Here, the two synchronous rectifiers 61, 62 are respectively driven by different synchronous driving signals, which are respectively produced by two synchronous controllers 51, 52, for alternatively conducting the secondary sides of two transformers 40, 41, so as to transmit two induced power to an output terminal 7. Therefore, when the switching elements Q1, Q4 of the switch unit 2 are conducted, the input power passes through the primary side of the transformer 40 (T1), and the synchronous controller 51 produces a synchronous control signal to drive the synchronous rectifier 61 to conduct, so as to produce an induced power at the secondary side of the transformer 40. And, when the switching elements Q3, Q4 of the switch unit 2 are conducted, the input power passes through the transformer 41 (T2), and the synchronous controller 51 senses the polar variation of the voltage and then stops driving the conduction of the synchronous rectifier 61, and at the same time, the synchronous controller 52 produces a synchronous driving signal to drive the synchronous rectifier 62 to conduct, so as to produce an induced power at the secondary side of the transformer 41 (T2). Besides, since the sides of the secondary side windings of the two transformers 40, 41 which have opposite polarities are electrically connected with each other, when two transformers 40, 41 respectively provide an induced power by turns, a DC output power can be provided to the output terminal 7 through modifying two synchronous rectifiers 61, 62. Therefore, a DC to DC resonant converter is formed.

The circuit architecture described above is advantageous of:
1. Replacing the central tap output mode used in the conventional transformer which has more difficult procedure during fabrication.
2. Solving the oversensitive problem found in the conventional synchronous controller by making the synchronous controller to provide the synchronous control signal based on sensing the polar variation of input power at the primary side.
3. Solving the problem of low efficiency which is caused by positioning the synchronous controller at the secondary side in the prior art.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A resonant converter for improving synchronous rectification control, wherein the resonant converter is connected to a power source for obtaining an input power, and through conduction and cutoff of a switch unit, the period of the input power to be transmitted to a resonant circuit is modified, the resonant converter further comprising:

two transformers, electrically connected to the resonant circuit, wherein the input power modified by the resonant circuit is obtained by the primary sides of two transformers, and two induced power with opposite phases are respectively produced at the secondary sides;

two synchronous controllers, electrically connected to the primary sides of two transformers respectively, wherein through sensing the polar variation of the voltage from the transformers, the two synchronous controllers individually provide a synchronous driving signal; and two synchronous rectifiers, electrically connected to the secondary sides of two transformers, wherein two synchronous rectifiers are respectively driven by the different synchronous driving signals respectively produced by two synchronous controllers, so as to alternatively conduct the power to an output terminal.

2. The resonant converter as claimed in claim 1, wherein one of the synchronous controllers is connected to one side of one transformer which has a positive polarity, and the other synchronous controller is connected to one side of the other transformer which has a negative polarity.

3. The resonant converter as claimed in claim 1, wherein the sides of the primary windings of the two transformers which have identical polarity are connected to one identical terminal of the resonant circuit, and the sides of the secondary windings of the transformer which have opposite polarities are electrically connected with each other for producing two induced power with opposite phases.

4. The resonant converter as claimed in claim 3, wherein the sides of the secondary windings of the transformer which have opposite polarities are electrically connected with each other, and one of the sides is connected to the output terminal.

5. The resonant converter as claimed in claim 1, wherein the resonant circuit sequentially includes, in series, a resonant capacitor, a first resonant inductor and a second resonant inductor, which is connected with the transformers in parallel.

* * * * *